(12) United States Patent
Whinmill et al.

(10) Patent No.: US 8,701,134 B2
(45) Date of Patent: Apr. 15, 2014

(54) USER PRESENCE CONFIDENCE AND MEDIA CONTENT VIEWING ESTIMATION

(75) Inventors: Trevor Whinmill, Southampton (GB); James Wilson, Sturminster Newton (GB); Simon Dyke, Southampton (GB); Ian R. Shelton, Ringwood (GB); Tony Leigh, London (GB); Matt Spencer, Chandlers Ford (GB); David Whittaker, Waterford (GB)

(73) Assignee: Cisco Technology Inc., San Jose, CA (US)

( * ) Notice: Subject to any disclaimer, the term of this patent is extended or adjusted under 35 U.S.C. 154(b) by 91 days.

(21) Appl. No.: 13/259,308

(22) PCT Filed: Apr. 27, 2010

(86) PCT No.: PCT/IB2010/051835
§ 371 (c)(1), (2), (4) Date: Dec. 1, 2011

(87) PCT Pub. No.: WO2011/030231
PCT Pub. Date: Mar. 17, 2011

(65) Prior Publication Data
US 2013/0061256 A1    Mar. 7, 2013

(30) Foreign Application Priority Data
Sep. 8, 2009   (GB) .................................. 0915569.8

(51) Int. Cl.
*H04N 7/16*      (2011.01)
(52) U.S. Cl.
USPC ................................................. 725/14; 725/9
(58) Field of Classification Search
None
See application file for complete search history.

(56) References Cited

U.S. PATENT DOCUMENTS

| | | | |
|---|---|---|---|
| 4,769,697 A | 9/1988 | Gilley et al. | |
| 5,771,307 A | 6/1998 | Lu et al. | |

(Continued)

FOREIGN PATENT DOCUMENTS

| | | | |
|---|---|---|---|
| EP | 1 318 679 A3 | 6/2003 | |
| WO | WO 02/47381 A2 | 6/2002 | |
| WO | WO 2007/114789 A1 | 10/2007 | |

OTHER PUBLICATIONS

International Search Report from the European Patent Office in International Application No. PCT/IB2010/051835 mailed Oct. 12, 2010.

(Continued)

*Primary Examiner* — Fernando Alcon
(74) *Attorney, Agent, or Firm* — Husch Blackwell LLP (57) ABSTRACT

A content viewing estimation system including a module to receive a time measurement of how long at least part of a content item was rendered by an end-user rendering unit and outputted for display to an audio-visual outputting arrangement during a time window, a module to determine user interaction with the end-user rendering unit and/or the audio-visual outputting arrangement, a module to calculate an average content item duration of a plurality of content items rendered by the end-user rendering unit during the time window, and a module to estimate viewing by the user of the at least part content item such that if user interaction was not determined during the time window then time attributed to the viewing of the at least part content item is set to the minimum of a capping limit, the time measurement, and the average content item duration. Related apparatus and methods are also described.

10 Claims, 5 Drawing Sheets

(56) References Cited

U.S. PATENT DOCUMENTS

| | | | |
|---|---|---|---|
| 5,892,856 A | 4/1999 | Cooper et al. | |
| 6,400,996 B1 | 6/2002 | Hoffberg et al. | |
| 6,530,082 B1 | 3/2003 | Del Sesto et al. | |
| 7,139,723 B2* | 11/2006 | Conkwright et al. | 705/7.33 |
| 7,644,423 B2 | 1/2010 | Ludvig et al. | |
| 2002/0129368 A1 | 9/2002 | Schlack et al. | |
| 2002/0199193 A1* | 12/2002 | Gogoi et al. | 725/46 |
| 2003/0037333 A1* | 2/2003 | Ghashghai et al. | 725/46 |
| 2003/0084448 A1* | 5/2003 | Soundararajan | 725/46 |
| 2003/0101451 A1* | 5/2003 | Bentolila et al. | 725/34 |
| 2004/0019675 A1 | 1/2004 | Hebeler, Jr. et al. | |
| 2004/0073918 A1* | 4/2004 | Ferman et al. | 725/34 |
| 2005/0076358 A1* | 4/2005 | Yamada | 725/14 |
| 2005/0120366 A1 | 6/2005 | Thurbon | |
| 2005/0229199 A1 | 10/2005 | Yabe | |
| 2006/0075420 A1* | 4/2006 | Ludvig et al. | 725/9 |
| 2006/0075421 A1 | 4/2006 | Roberts et al. | |
| 2006/0156326 A1* | 7/2006 | Goronzy et al. | 725/13 |
| 2007/0240181 A1 | 10/2007 | Eldering et al. | |
| 2007/0288627 A1 | 12/2007 | Abella et al. | |
| 2008/0162200 A1 | 7/2008 | O'Sullivan et al. | |
| 2008/0300965 A1 | 12/2008 | Doe | |
| 2009/0052859 A1 | 2/2009 | Greenberger et al. | |
| 2009/0055862 A1 | 2/2009 | Knoller et al. | |
| 2009/0265215 A1 | 10/2009 | Lindstrom | |
| 2010/0122297 A1* | 5/2010 | Varadarajan et al. | 725/46 |
| 2011/0307913 A1* | 12/2011 | Wang et al. | 725/9 |
| 2013/0014146 A1* | 1/2013 | Bhatia et al. | 725/14 |
| 2014/0013345 A1* | 1/2014 | Vinson et al. | 725/14 |

OTHER PUBLICATIONS

Written Opinion of the International Searching Authority from the European Patent Office in International Application No. PCT/IB2010/051835.

* cited by examiner

USER PRESENCE CONFIDENCE AND MEDIA CONTENT VIEWING ESTIMATION

CROSS REFERENCE TO RELATED APPLICATIONS

The present application is a 35 USC §371 application of PCT/IB2010/051835, filed on Apr. 27, 2010 and entitled "USER PRESENCE CONFIDENCE AND MEDIA CONTENT VIEWING ESTIMATION", which was published on Mar. 17, 2011 in the English language with International Publication Number WO 2011/030231 and which claims priority of GB Patent Application 0915569.8 filed Sep. 8, 2009, the content of all of which is incorporated herein by reference.

FIELD OF THE INVENTION

The present invention relates to user presence confidence.

BACKGROUND OF THE INVENTION

The following references are believed to represent the state of the art:

US Published Patent Application 2003/0037333 Ghashghai, et al.;
US Published Patent Application 2004/0019675 of Hebeler, J. R. et al.;
US Published Patent Application 2005/0120366 of Thurbon;
US Published Patent Application 2005/0229199 of Yabe;
US Published Patent Application 2007/0288627 of Abella, et al.;
US Published Patent Application 2008/0162200 of O'Sullivan, et al.;
US Published Patent Application 2009/0052859 of Greenberger;
U.S. Pat. No. 4,769,697 to Gilley, et al.;
U.S. Pat. No. 5,771,307 to Lu, et al.;
U.S. Pat. No. 5,892,856 to Cooper, et al.;
U.S. Pat. No. 5,913,067 to Klein;
U.S. Pat. No. 6,400,996 to Hoffberg, et al.;
European Published Patent Application EP 1,318,679 of Thomson Licensing S.A.; and
PCT Published Patent Application WO 2007/114789 of Heulab PTE Ltd.

SUMMARY OF THE INVENTION

The present invention, in certain embodiments thereof, seeks to provide an improved user presence confidence system.

By way of introduction, there is a growing trend to develop systems to measure television (TV) viewing habits as part of viewer preference profiling.

Profiling may be used as a source of input to the decision making process operating in a targeted substitute advertising (TSA) system, by way of example only.

The concept of counting time whilst tuned to a particular TV program is reasonably straightforward, but confidence in the result involves consideration of the following.

How does a measurement system know the program was actually viewed by anyone? In installations where the end-user rendering unit is an external device to the TV, for example, but not limited to, a satellite or cable set-top box (STB), it is entirely feasible that the STB has been left tuned to a broadcast channel whilst the TV is actually switched off. Within the context of user preference profiling, drawing conclusions from viewing measurements taken during the absence of a viewer will reduce the level of confidence placed on the profiling result.

Detecting user presence through pure system activity monitoring presents a conundrum, does the lack of activity equate to the absence of a user or does it just mean our user is viewing a particular channel for a sustained period of time without activity.

Having solved the problem of detecting user presence, how confident are we that the user is actually viewing content on a tuned program?

There are examples of user activity which brings into question the user's intent to watch a tuned program. Consider the following scenarios.

Sustained channel surfing or program hopping is clear evidence of user presence, but represents low confidence in user preference profiling based on the genre of a tuned program. Additionally, modern end-user rendering units offer on-screen-displays (OSDs) which hide any form of visible video output. For example, the user can select to load and study an on screen TV guide, configure favorite channel line-up via a system setup screen, or load an interactive application.

There is thus provided in accordance with an embodiment of the present invention, a media content viewing estimation system including a plurality of operationally connected modules including a receive module to receive a time measurement of how long at least part of a content item was rendered by an end-user rendering unit and outputted for display to an audio-visual outputting arrangement by the end-user rendering unit during a time window, the time window being one from a set of time windows, an activity determination module to determine user interaction with the end-user rendering unit and/or the audio-visual outputting arrangement, an average content item duration module to calculate an average content item duration of a plurality of content items rendered by the end-user rendering unit during the time window, and a viewing estimation module to estimate viewing by the user of the at least part content item such that if user interaction was not determined during the time window then time attributed to the viewing of the at least part content item is set to the minimum of a capping limit, the time measurement of how long the at least part content item was rendered and outputted for display to the audio-visual outputting arrangement, and the average content item duration.

Further in accordance with an embodiment of the present invention the capping limit applied to the time attributed to the viewing of the at least part content item depends on a genre of the content item.

Still further in accordance with an embodiment of the present invention a size of the capping limit is dependent on a time of day that the time window is located in.

Additionally in accordance with an embodiment of the present invention the length of the time window is dependent on a time of day and/or a day of the week.

Moreover in accordance with an embodiment of the present invention the viewing estimation module is operative to estimate the viewing by the user of the at least part content item such that if user interaction was determined during the time window then the time attributed to the viewing of the at least part content item is equal to the time measurement of how long the at least part content item was rendered and outputted for display to the audio-visual outputting arrangement.

Further in accordance with an embodiment of the present invention the modules include a rendering module to render an on-screen-display on the audio-visual outputting arrangement to solicit an acknowledgement from the user, and a user input module to monitor for the acknowledgement of the user, wherein the viewing estimation module is operative to estimate the viewing by the user of the at least part content item such that if the acknowledgement is provided by the user within a timeout period then the time attributed to the viewing of the at least part content item is equal to the time measurement of how long the at least part content item was rendered and outputted for display to the audio-visual outputting arrangement, and if the acknowledgement is not provided by the user within the timeout period then the time attributed to the viewing of the at least part content item is less than the time measurement of how long the at least part content item was rendered and outputted for display to the audio-visual outputting arrangement.

Still further in accordance with an embodiment of the present invention if the acknowledgement is not provided by the user within the timeout period then the time attributed to the viewing of the at least part content item is reduced to zero.

Additionally in accordance with an embodiment of the present invention the modules include a media content output checker to check an output status of the end-user content rendering device to the audio-visual outputting arrangement.

Moreover in accordance with an embodiment of the present invention the system is implemented in the end-user rendering unit, and the modules include an activity monitoring module to monitor user interaction with the end-user rendering unit and/or the audio-visual outputting arrangement, during the time window, for reporting the user interaction to the activity determination module.

There is also provided in accordance with still another embodiment of the present invention a media content viewing estimation system including a plurality of operationally connected modules including a receive module to receive a time measurement of how long at least part of a content item was rendered by an end-user rendering unit and outputted for display to an audio-visual outputting arrangement by the end-user rendering unit during a time window, the time window being one from a set of time windows, an activity determination module to determine user interaction with the end-user rendering unit and/or the audio-visual outputting arrangement, and a viewing estimation module to estimate viewing by the user of the at least part content item such that if user interaction was not determined during the time window then time attributed to the viewing of the at least part content item is reduced to a capping limit, however, if the user interaction was not determined during the time window, and the at least part content item has a genre which is predetermined as a preferred genre of the user, and a measured duration of content having the genre in the time window is greater than the duration of content having any other genre in the time window, and the measured duration of the content having the genre in the time window is greater than an average content duration in the time window, then time attributed to the viewing of the at least part content item is not reduced to the capping limit, but is set to be a certain fraction of the time measurement of how long the at least part content item was rendered and outputted for display to the audio-visual outputting arrangement.

Further in accordance with an embodiment of the present invention the capping limit applied to the time attributed to the viewing of the at least part content item depends on a genre of the content item.

Still further in accordance with an embodiment of the present invention a size of the capping limit is dependent on a time of day that the time window is located in.

Additionally in accordance with an embodiment of the present invention the length of the time window is dependent on a time of day and/or a day of the week.

Moreover in accordance with an embodiment of the present invention the viewing estimation module is operative to estimate the viewing by the user of the at least part content item such that if user interaction was determined during the time window then the time attributed to the viewing of the at least part content item is equal to the time measurement of how long the at least part content item was rendered and outputted for display to the audio-visual outputting arrangement.

Further in accordance with an embodiment of the present invention the modules include a rendering module to render an on-screen-display on the audio-visual outputting arrangement to solicit an acknowledgement from the user, and a user input module to monitor for the acknowledgement of the user, wherein the viewing estimation module is operative to estimate the viewing by the user of the at least part content item such that if the acknowledgement is provided by the user within a timeout period then the time attributed to the viewing of the at least part content item is equal to the time measurement of how long the at least part content item was rendered and outputted for display to the audio-visual outputting arrangement, and if the acknowledgement is not provided by the user within the timeout period then the time attributed to the viewing of the at least part content item is less than the time measurement of how long the at least part content item was rendered and outputted for display to the audio-visual outputting arrangement.

Still further in accordance with an embodiment of the present invention if the acknowledgement is not provided by the user within the timeout period then the time attributed to the viewing of the at least part content item is reduced to zero.

Additionally in accordance with an embodiment of the present invention the modules include a media content output checker to check an output status of the end-user content rendering device to the audio-visual outputting arrangement.

Moreover in accordance with an embodiment of the present invention the system is implemented in the end-user rendering unit, and the modules include an activity monitoring module to monitor user interaction with the end-user rendering unit and/or the audio-visual outputting arrangement, during the time window, for reporting the user interaction to the activity determination module.

There is also provided in accordance with still another embodiment of the present invention a media content viewing estimation method including receiving a time measurement of how long at least part of a content item was rendered by an end-user rendering unit and outputted for display to an audio-visual outputting arrangement by the end-user rendering unit during a time window, the time window being one from a set of time windows, determining user interaction with the end-user rendering unit and/or the audio-visual outputting arrangement, calculating an average content item duration of a plurality of content items rendered by the end-user rendering unit during the time window, and estimating viewing by the user of the at least part content item such that if user interaction was not determined during the time window then time attributed to the viewing of the at least part content item is set to the minimum of a capping limit, the time measurement of how long the at least part content item was rendered and outputted for display to the audio-visual outputting arrangement, and the average content item duration.

There is also provided in accordance with still another embodiment of the present invention a media content viewing estimation method including receiving a time measurement of how long at least part of a content item was rendered by an end-user rendering unit and outputted for display to an audio-visual outputting arrangement by the end-user rendering unit during a time window, the time window being one from a set of time windows, determining user interaction with the end-user rendering unit and/or the audio-visual outputting arrangement, and estimating viewing by the user of the at least part content item such that if user interaction was not determined during the time window then time attributed to the viewing of the at least part content item is reduced to a capping limit, however, if the user interaction was not determined during the time window, and the at least part content item has a genre which is predetermined as a preferred genre of the user, and a measured duration of content having the genre in the time window is greater than the duration of content having any other genre in the time window, and the measured duration of the content having the genre in the time window is greater than an average content duration in the time window, then time attributed to the viewing of the at least part content item is not reduced to the capping limit, but is set to be a certain fraction of the time measurement of how long the at least part content item was rendered and outputted for display to the audio-visual outputting arrangement.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
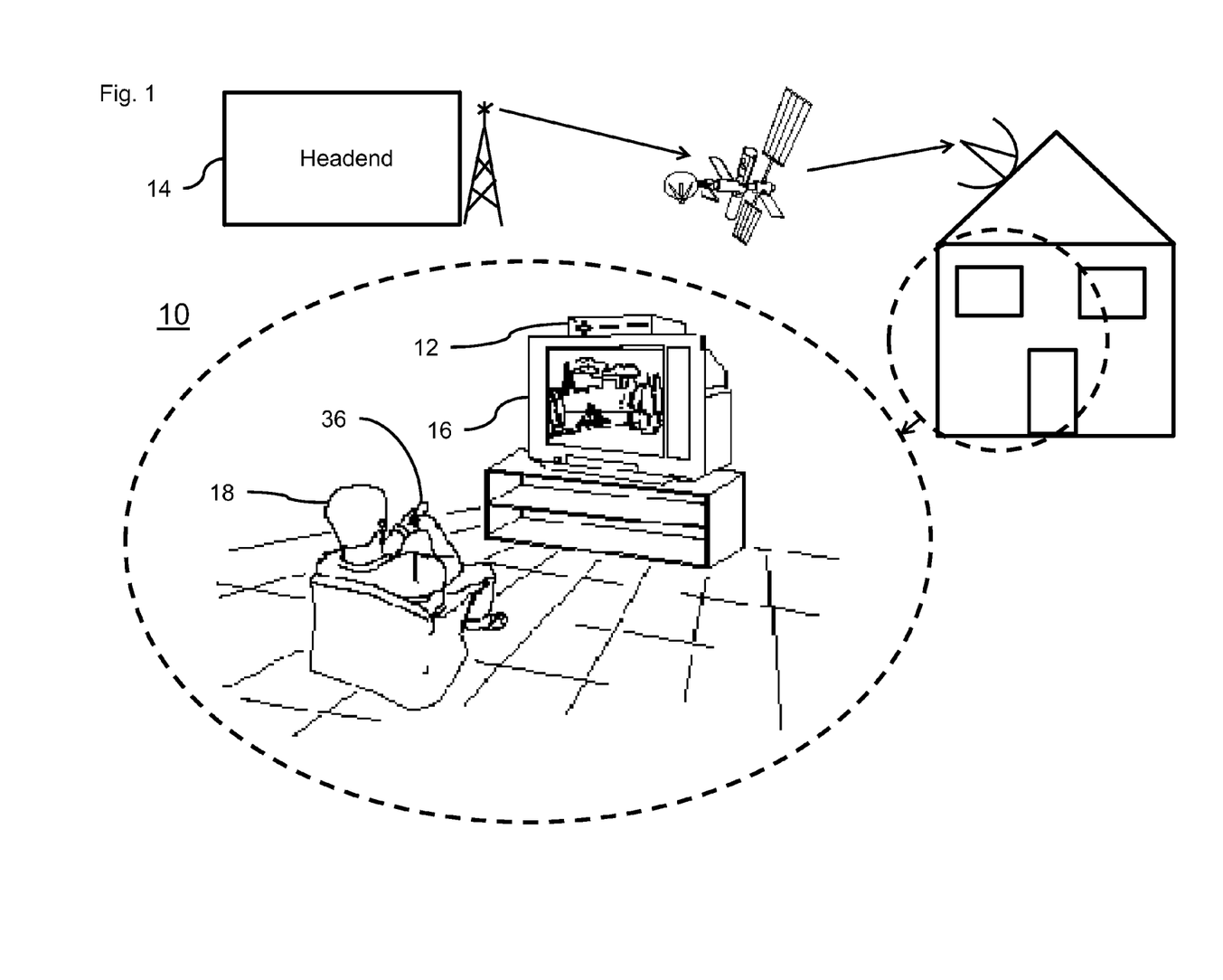
FIG. 1 is a partly pictorial, partly block diagram view of a media content viewing estimation system constructed and operative in accordance with an embodiment of the present invention.

Reference is now made to FIG. 1 which is a partly pictorial, partly block diagram view of a media content viewing estimation system 10 constructed and operative in accordance with an embodiment of the present invention.

Content is broadcast from a broadcast Headend 14 to a plurality of the end-user rendering units 12 (only one shown for the sake of clarity).

It will be appreciated by those ordinarily skilled in the art that the Headend 14 is used by way of example only and that the present invention is also applicable to content supplied to the end-user rendering units 12 from any suitable server whether by multicast, unicast, pushing content or pulling content, for example, but not limited to, a video-on-demand (VOD) server or a cable Headend and by any suitable form of transfer, for example, but not limited to, satellite, cable, terrestrial communications, mobile telephone communications and Internet.

The end-user rendering unit 12 may be any suitable rendering device for example, but not limited to, a set-top box (STB), a suitably configured computer or a mobile device such as a mobile telephone, television, computer or PDA.

The end-user rendering unit 12 renders the received content item. The rendered content item is then typically outputted for display to an audio-visual outputting arrangement 16 by the end-user rendering unit 12 for viewing by a viewer (or user) 18. The audio-visual outputting arrangement 16 may be a single output device such as a TV with integrated audio output or two or more separate devices such as a separate display-device and audio-amplifier.

In the media content viewing estimation system 10, a positive confidence of user presence is generally achieved if certain user activity with the end-user rendering unit 12 and/or the audio-visual outputting arrangement 16 occurs within tolerance periods defined before, during and after the broadcast time for the current program or content item.

Figure 2:
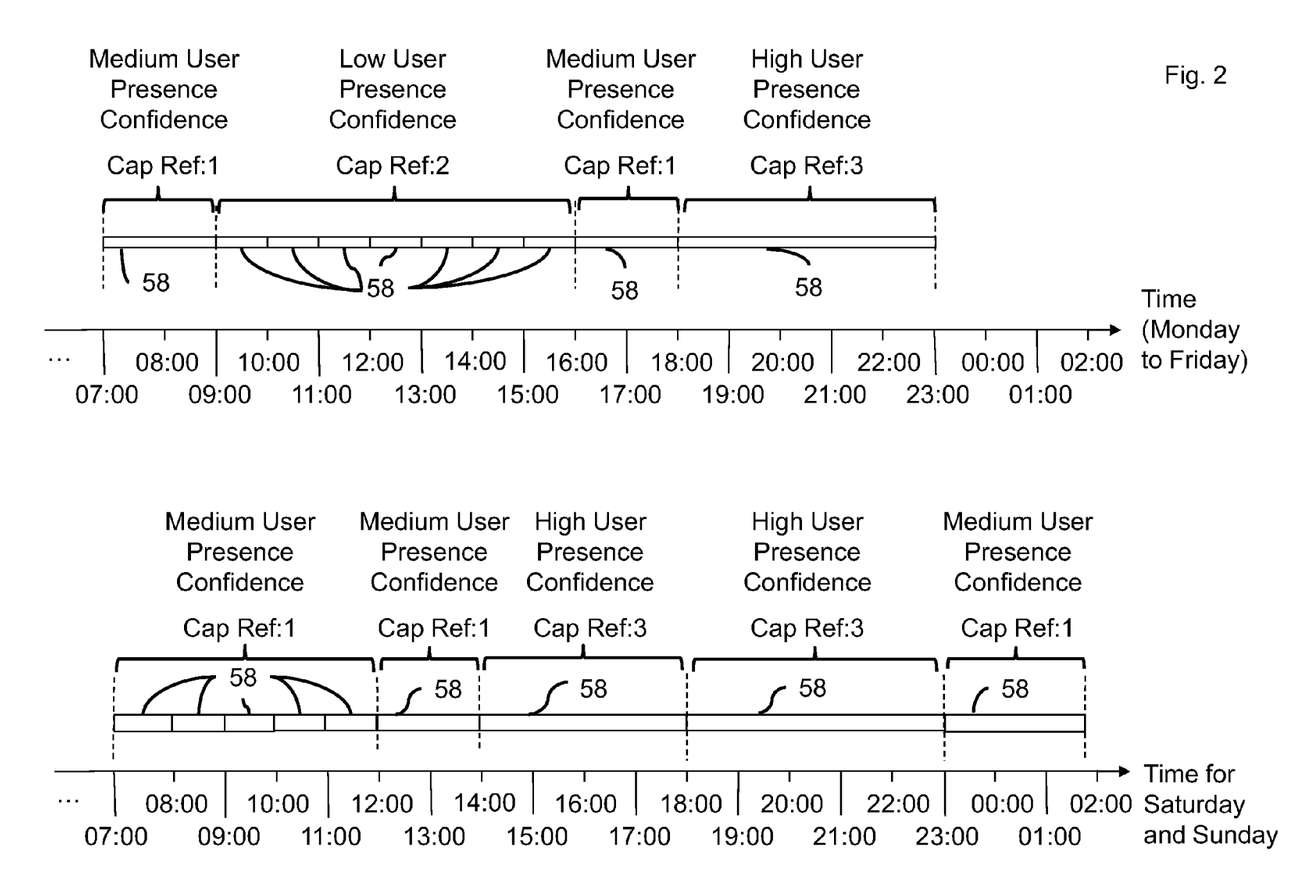
FIG. 2 is a partly pictorial, partly block diagram view of time windows of the system of FIG. 1.

Reference is now made to FIG. 2, which is a partly pictorial, partly block diagram view of time windows 58 of the system 10 of FIG. 1. Reference is also made to FIG. 1

The media content viewing estimation system 10 typically defines a configurable set of generally variable length time windows 58 covering a day such that a series of the time windows 58 break a twenty-four hour period into parts deemed meaningful to TV viewing habits. The configuration data set provides flexibility in depth and scope of time window definition, allowing unique windows to be specifically configured per day, or generic windows applied to set day patterns, for example, but not limited to, a week day and a weekend day. Therefore, the length of each time window is typically dependent on the time of day and/or the day of the week.

A time window sequence may or may not cover all available time in a 24 hour period. The coverage of the time windows may be used to configure the activation of the media content viewing estimation system 10 during a particular day. In other words, the media content viewing estimation system 10 may be configured not to estimate viewing for time periods not included in a time window. Table 1 shows an example of a time window configuration set.

TABLE 1

| Example Time Window Configuration Data. | | | | | |
|---|---|---|---|---|---|
| Day | Window 1 | Window 2 | Window 3 | Window 4 | Window 5 |
| Mon-Fri | Start: 07:00<br>End: 09:00<br>Cap Ref: 1 | Start: 09:00<br>End: 10:00<br>Cap Ref: 2 | Start: 10:00<br>End: 11:00<br>Cap Ref: 2 | Start: 12:00<br>End: 13:00<br>Cap Ref: 2 | Start: 13:00<br>End: 14:00<br>Cap Ref: 2 |
| Sat-Sun | Start: 07:00<br>End: 08:00<br>Cap Ref: 2 | Start: 08:00<br>End: 09:00<br>Cap Ref: 2 | Start: 09:00<br>End: 10:00<br>Cap Ref: 2 | Start: 10:00<br>End: 11:00<br>Cap Ref: 2 | Start: 11:00<br>End: 12:00<br>Cap Ref: 2 |

TABLE 1-continued

Example Time Window Configuration Data.

| Day | Window 6 | Window 7 | Window 8 | Window 9 |
|---|---|---|---|---|
| Mon-Fri | Start: 14:00<br>End: 15:00<br>Cap Ref: 2 | Start: 15:00<br>End: 16:00<br>Cap Ref: 2 | Start: 16:00<br>End: 18:00<br>Cap Ref: 1 | Start: 18:00<br>End: 23:00<br>Cap Ref: 3 |
| Sat-Sun | Start: 12:00<br>End: 14:00<br>Cap Ref: 1 | Start: 14:00<br>End: 18:00<br>Cap Ref: 3 | Start: 18:00<br>End: 23:00<br>Cap Ref: 3 | Start: 23:00<br>End: 02:00<br>Cap Ref: 3 |

The media content viewing estimation system 10 may apply capping limits to content rendering measurements. The capping limits limit the amount of time attributed to content viewing if there is no activity from the viewer 18 during a time window. The capping limits are typically dependent on the time window that the content item is being viewed in, as well as the genre of the content item or genre of the channel of the content item. For each time window 58, the total time attributed to content items of the same genre is capped to a value which is genre specific. In other words, even if there are many content items of the same genre in one time window 58, all the items of that genre are grouped together and attributed a single value capping limit. For example, if a movie is being shown during one time window, the viewing capping limit for the movie may be longer than the viewing capping limit for a news item.

A "genre" is typically used to categorize broadcast channels and/or programs that the user 18 can select to view, for example, but not limited to, sport, drama, soap, movie, news, documentary or any other suitable categorization.

See table 2 which shows an example of a measurement cap configuration set.

Each time window in table 1 includes a reference to one of the capping limit sub-tables of table 2.

A decreasing range of capping limits could be configured for a particular content type, with application of the limits being determined by the amount of time since the last user activity.

In accordance with an alternative embodiment of the present invention the capping limits are replaced by percentages which limit time attributed to viewing a content item to a particular percentage of the content rendering measurement.

The media content viewing estimation system 10 provides a mechanism to employ a defensive or relaxed strategy for specific time windows during a day, depending on a correlation to either a statistically low or high user presence confidence for a particular demographic group. Therefore, the duration of each of the time windows and the capping limits may be different for different users and different sets of time window tables and capping limit tables are sent to users of different demographic make-up.

TABLE 2

Example Measurement Capping Limits.

| Content<br>Category | Capping Limit<br>(units of minutes) |
|---|---|
| Cap Ref: 1 | |
| Sports | 30 |
| Movie | 60 |
| Soap | 35 |
| Documentary | 30 |
| News | 20 |
| other | 15 |
| Cap Ref: 2 | |
| Sports | 5 |
| Movie | 5 |
| Soap | 5 |
| Documentary | 5 |
| News | 5 |
| other | 5 |
| Cap Ref: 3 | |
| Sports | 60 |
| Movie | 180 |
| Soap | 60 |
| Documentary | 120 |
| News | 45 |
| other | 30 |

As an example, the following configuration strategy could be adopted. Configure more short time-windows with low capping limits for day periods correlating to statistically low confidence levels of user presence, thereby increasing the frequency of user activity checks and applying more stringent capping limits against rendering measurements. Configure fewer longer time-windows, generally with higher capping limits, for day periods correlating to statistically high confidence levels of user presence, thereby reducing the frequency of user activity checks which reduces processing overhead for high confidence time periods.

Table 1 provides an example configuration defining time-windows for weekdays and weekends. The example is based on a working household population, exhibiting a low confidence level of user presence during standard office working time periods. Time window duration and capping limits can be fine tuned based on feedback from households over time.

FIG. 2 shows part of a twenty four hour period broken up into the time windows 58 for Monday to Friday (top half of FIG. 2) and for Saturday and Sunday (bottom half of FIG. 2) based on the data of table 1. FIG. 2 shows that time periods of medium user presence confidence are generally associated with a single time window 58. Time periods of low user presence confidence are generally associated with many shorter time windows 58. Time periods of high user presence confidence are generally associated with a single longer time window 58.

Figure 3:
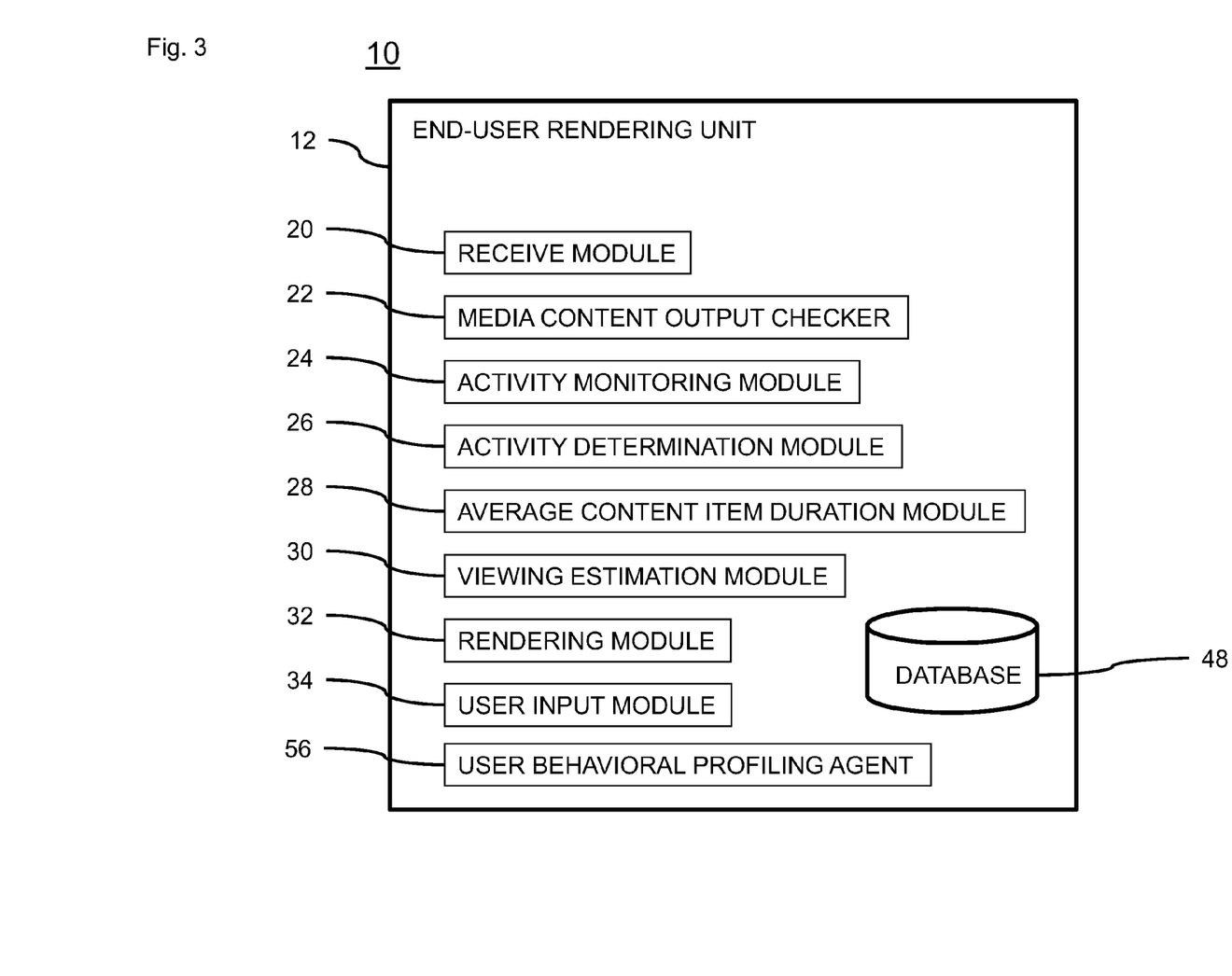
FIG. 3 is a block diagram view of an end-user rendering unit in the media content viewing estimation system of FIG. 1.

Reference is now made to FIG. 3, which is a block diagram view of an end-user rendering unit 12 in the media content viewing estimation system 10 of FIG. 1. Reference is also made to FIG. 1.

The term media as used in the specification and claims is defined to include audio and/or video. The media is typically live content. However, it will be appreciated by those ordinarily skilled in the art that the media may be any suitable content for example, but not limited to, recordings, video-on-demand (VOD) content and/or interactive TV applications.

The media content viewing estimation system 10 is typically partially implemented in the end-user rendering units 12 and partially at the Headend 14. The time window configuration data and the capping limits data are typically prepared by the Headend 14 and sent to the end-user rendering units 12 by the Headend 14. Delivery by the Headend 14 may be addressable to all or a subset of the end-user rendering units 12. Additionally or alternatively, the time window configuration data and the capping limits data may be statically defined as a default package in the end-user rendering units 12. The processing of the time measurements of rendered content yielding the time attributed to content viewed by the user 18 is typically performed in the end-user rendering units 12, as will now be explained in more detail below.

The media content viewing estimation system 10 typically includes a plurality of operationally connected modules including a receive module 20, a media content output checker 22, an activity monitoring module 24, an activity determination module 26, an average content item duration module 28, a viewing estimation module 30, a rendering module 32, a user input module 34, a database 48; and a user behavioral profiling agent 56.

The rendering unit 30 of the media content viewing estimation system 10 may be the same as a rendering unit of the end-user rendering unit 12 which renders the content received from the Headend 14.

The video output state of the end-user rendering unit 12 needs to be examined as time is generally only attributed to viewing content when the video output state to the audio-visual outputting arrangement 16 is enabled. The video output may be disabled for a number of reasons including: the display is showing a full screen user interface view, for example, but not limited to, system settings or a program guide; failed conditional access states; playback of recorded content when viewing of recorded content is not being measured; or the STB or TV is in standby.

Therefore, the media content output checker 22 is operative to continually check the output status of the end-user content rendering device 12 to the audio-visual outputting arrangement 16. Output status events are typically continually monitored during each time window in order to correctly determine, at the end of each time window, the actual content rendered and outputted for display to the audio-visual outputting arrangement 16.

Generally, the media content output checker 22 continually monitors the output status of the end-user rendering unit 12 and gates the content measurement counter(s) (not shown). In other words, if output from the end-user rendering unit 12 is not detected, the content measurement counter(s) are disabled. Therefore, the readings from the content measurement counter(s) may be read by the media content output checker 22 yielding the time measurement(s) of the content item(s), or part(s) of the content item(s), actually rendered by the end-user rendering unit 12 and outputted for display on the audio-visual outputting arrangement 16.

The activity monitoring module 24 is typically operative to monitor user interaction with the end-user rendering unit 12 and/or the audio-visual outputting arrangement 16, during each time window, for reporting the user interaction to the activity determination module 26. The user interaction is typically monitored by monitoring remote control commands sent by a user remote control unit 36 to the end-user rendering unit 12 or the audio-visual outputting arrangement 16 or via the user pressing buttons on the "front panel" of the end-user rendering unit 12. It will be appreciated that the end-user rendering unit 12 can only determine user interaction from the remote control commands directed to the audio-visual outputting arrangement 16 if the end-user rendering unit 12 has the ability to detect the remote control commands directed to the audio-visual outputting arrangement 16 and know that the commands are directed to the audio-visual outputting arrangement 16 and not another device. User interaction events are typically continually monitored during each time window. The user interaction events are time-stamped and logged for subsequent processing at the end of the each time window. It will be appreciated by those ordinarily skilled in the art that user interaction with other devices in the vicinity of the end-user rendering unit 12 may be useful indicators of the user viewing the content outputted by the end-user rendering unit 12.

Non-user driven events are not considered as "user interaction", for example, but not limited to, when the end-user rendering unit 12 goes into standby automatically (e.g.: between 2-5 a.m.).

It should be noted that some user interaction with the end-user rendering unit 12 or the audio-visual outputting arrangement 16 is not monitored by the activity monitoring module 24, for example, but not limited to, if the interaction is impossible or difficult to monitor by the end-user rendering unit 12 such as the user 18 changing controls on the front panel of the audio-visual outputting arrangement 16.

Typically, at the end of each time window (or any other suitable time period), the activity determination module 26 is typically operative to determine user interaction with the end-user rendering unit 12 and/or the audio-visual outputting arrangement 16 based on the user interaction log received from the activity monitoring module 24. The user interaction log is processed to obtain a time-stamped audit trail of activity occurrence during the now completed time window.

The receive module 20 is operative to receive, from the media content output checker 22, the time measurement(s) of how long the content item(s), or part(s) of the content item(s), was actually rendered by the end-user rendering unit 12 and outputted for display on the audio-visual outputting arrangement 16 during the now completed time window. As a content item may straddle time windows and/or only part of a content item may be viewed, the time measurement(s) may include data for viewing part of a content item.

The viewing estimation module 30 is operative to estimate the viewing during the now completed time window by the user 18 of a content item (or part of the content item), such that, if:

(a) user interaction was determined by the activity determination module 26 during the now completed time window then the time attributed to the viewing of the content item (or part of the content item), is equal to the time measurement of how long the content item (or part of the content item) was rendered and outputted for display on the audio-visual outputting arrangement 16 during the now completed time window; and (b) if user interaction was not determined during the now completed time window then time attributed to the viewing of the content item (or part of the content item) is reduced to be less than the time measurement of how long the content item (or part of the content item) was rendered and outputted for display on the audio-visual outputting arrangement 16 during the now completed time window.

The time attributed to the viewing of the content item (or part of the content item) is typically stored in the database 48 for subsequent use, for example, but not limited to, for user profiling purposes.

In accordance with an embodiment of the present invention the viewing estimation module is operative to reduce the time attributed to viewing by the user of the content item (or part of the content item) to a capping limit.

In accordance with another embodiment of the present invention, the average content item duration module 28 is operative to calculate an average content item duration of a plurality of content items rendered by the end-user rendering unit 12 and outputted for display to the audio-visual outputting arrangement 16 during the now completed time window. Then, the viewing estimation module 30 is operative to estimate the viewing by the user 18 of the content item (or part of the content item) such that, if user interaction was not determined during the now completed time window then the time attributed to the viewing of the content item (or part of the content item) is set to the minimum of: the capping limit; the time measurement of how long the content item (or part of the content item) was rendered and outputted for display on the audio-visual outputting arrangement 16; and the average content item duration in the now completed time window. The use of the average content item duration is generally to cover scenarios where the content played in the time window contains many event boundaries which when coupled with the absence of user-activity further reduces confidence in user presence in the time window. Therefore, a more defensive strategy may be employed by using the average content item duration for the attributed viewing time if the average content item duration is less than the appropriate genre capping limit.

In accordance with yet another embodiment of the present invention, the capping limit applied to the time attributed to the viewing of the content item (or part of the content item) typically depends on the genre of the content item, so that for each time window, the total time attributed to content items of the same genre is capped to a value which is genre specific. In other words, even if there are many content items of the same genre in a time window, all the items of that genre are grouped together and attributed a single value capping limit for the time window. An example is shown below with reference to FIG. 5. Therefore, the viewing estimation module 30 is operative to estimate the viewing by the user 18 of content such that, if user interaction was not determined during the now completed time window, then the time attributed to the viewing of the content, of a particular genre, is set to the minimum of: the capping limit for the particular genre; the time measurement of how long the content of the particular genre was rendered and outputted for display on the audio-visual outputting arrangement 16; and the average content item duration in the now completed time window. In other words, content of the same genre is grouped together for the purpose of estimating the time attributed to the viewing of content.

In accordance with a further embodiment of the present invention, the size of the capping limit is typically dependent on the time of day that the time window is located in, as described above. In other words, different capping limits may be applied to the same genre of content during different time windows as shown in table 1 which refers to different sub-tables of table 2 for different time windows.

The calculations performed by the media content output checker 22, the activity determination module 26, the average content item duration module 28 and the viewing estimation module 30 may be performed at any suitable time and not necessarily after the end of each time window.

In accordance with an alternative embodiment of the present invention, at least part of the functionality of at least one of the following modules is implemented at the Headend 14: the receive module 20; the media content output checker 22; the activity determination module 26; the average content item duration module 28; and the viewing estimation module 30. The rendering time measurements and the logs of user interaction need to be sent to the Headend 14.

Figure 4:
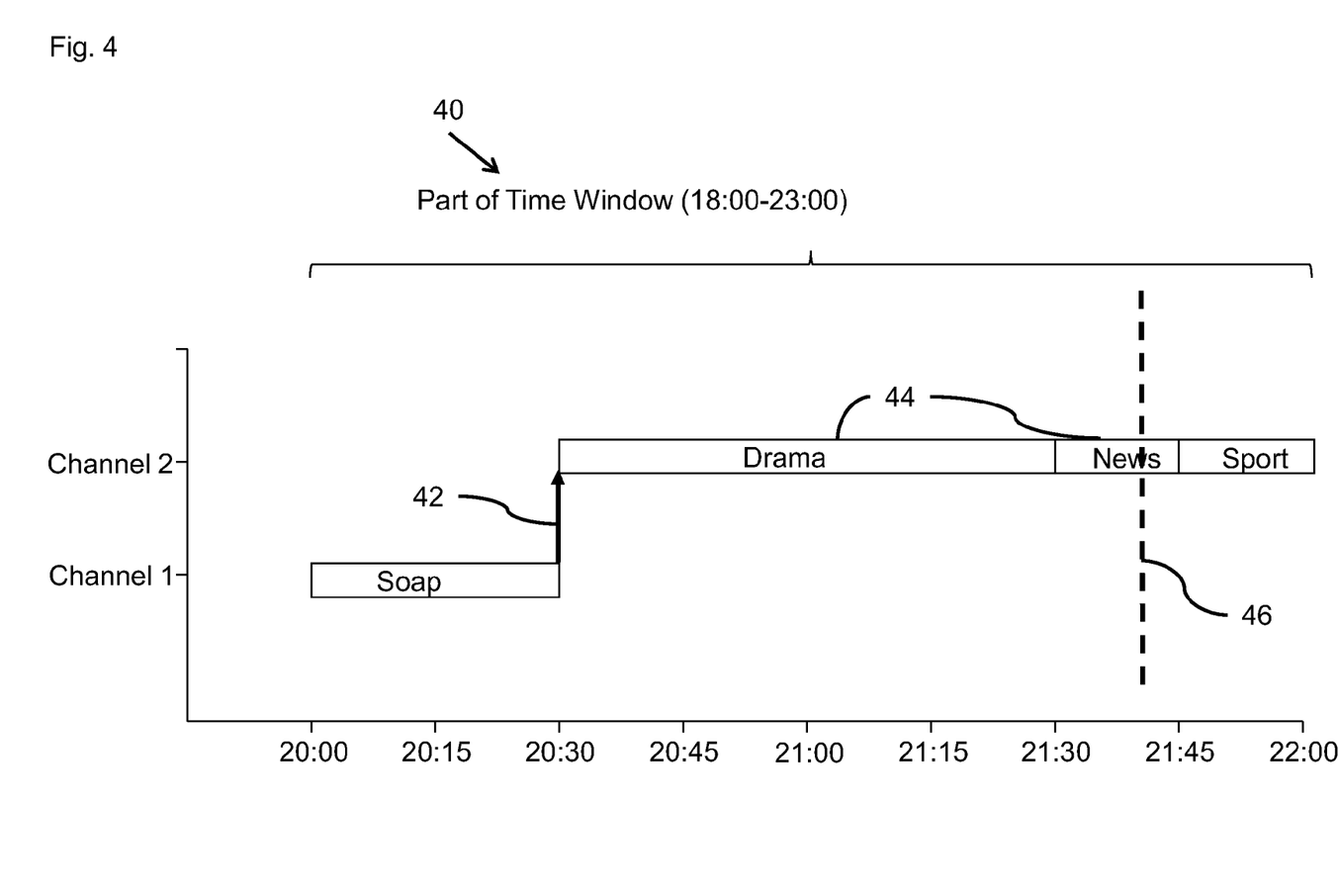
FIG. 4 is a partly pictorial, partly block diagram view of a first example of viewing estimation in the media content viewing estimation system of FIG. 1.

Reference is now made to FIG. 4, which is a partly pictorial, partly block diagram view of a first example of viewing estimation in the media content viewing estimation system 10 of FIG. 1.

FIG. 4 illustrates a scenario where user interaction is detected during a time window 40.

The time window 40 extends from 18:00 to 23:00. Only part of the time window 40 is shown for the sake of simplicity.

The user interaction during the time window 40 relates to: the user 18 (FIG. 1) issuing a remote control command to change the channel from channel 1 to channel 2 at 20:30 (arrow 42); and the user 18 issuing a remote control command to put the audio-visual outputting arrangement 16 (FIG. 1) in standby at 21:40 (dotted line 46).

Two content items 44 rendered by the end-user rendering unit 12 (FIG. 1) and outputted to the audio-visual outputting arrangement 16 on channel 2 include a drama program for 1 hour and a news program for 10 minutes.

As there was user interaction (the arrow 42 and the dotted line 46) with the end-user rendering unit 12 and/or the audio-visual outputting arrangement 16 during the time window 40, the time attributed to viewing of the content items 44 is the actual time that the content items 44 were rendered by the end-user rendering unit 12 and outputted to the audio-visual outputting arrangement 16.

Figure 5:
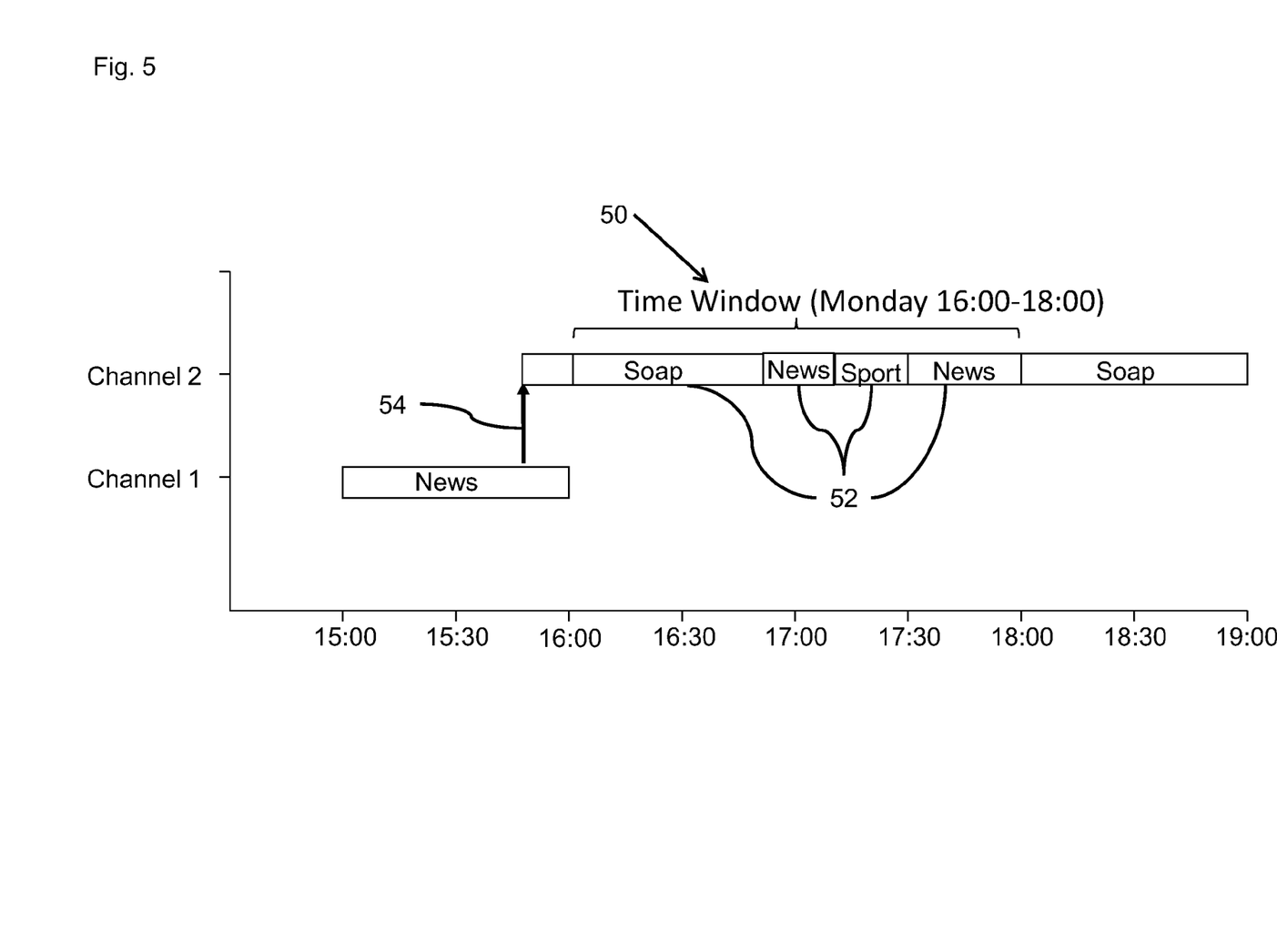
FIG. 5 is a partly pictorial, partly block diagram view of a second example of viewing estimation in the media content viewing estimation system of FIG. 1.

Reference is now made to FIG. 5, which is a partly pictorial, partly block diagram view of a second example of viewing estimation in the media content viewing estimation system 10 of FIG. 1.

FIG. 5 illustrates a scenario where user activity is not detected during a time window 50 which extends from 16:00 to 18:00 on a Monday. The user 18 (FIG. 1) changed from channel 1 to channel 2 prior to the start of the time window 50 (arrow 54) and no user interaction with the end-user rendering unit 12 (FIG. 1) or the audio-visual outputting arrangement 16 (FIG. 1) was detected during the time window 50.

During the time window 50 the following content items 52 were rendered by the end-user rendering unit 12 (FIG. 1) and outputted for display to the audio-visual outputting arrangement 16 (FIG. 1): a soap program for 50 minutes; a news program for 20 minutes; a sports program for 20 minutes; and another news program for 30 minutes.

At the end of the time window 50, the average content item duration of the content items 52 rendered by the end-user rendering unit 12 and outputted for display to the audio-visual outputting arrangement 16 is calculated. For the time window 50, the average content item duration is equal to 30 minutes (120 minutes divided by 4 content items 52).

Then, the viewing estimation module 30 (FIG. 1) is operative to estimate the viewing by the user 18 of the content items 52 so that the time attributed to the viewing of each content item 52 is set to the minimum of: the capping limit; the time measurement of how long the content item 52 was rendered and outputted for display on the audio-visual outputting arrangement 16; and the average content item duration in the time window.

The capping limits for the genres of soap, sports and news for the time window 50 on Mondays are given by CapRef:1 of table 2 and are: 35 minutes, 30 minutes and 20 minutes, respectively.

For the soap program with a rendering measurement of 50 minutes, the time attributed to viewing is the average content item duration of 30 minutes.

For the sports program with a rendering measurement of 20 minutes, the time attributed to viewing is the rendering time of 20 minutes.

For the news programs with a combined rendering measurement of 50 minutes, the time attributed to viewing is the genre capping limit for news of 20 minutes.

Reference is again made to FIGS. 1 and 3.

It may be appropriate to reduce the capping limits of certain genres in certain circumstances to more accurately reflect the individual viewer 18.

Data provided by user viewing habits may provide an indication of which genre(s) is preferred by the user 18.

Examples of behavioral analysis techniques that may be used by the user behavioral profiling agent 56 to establish a user's preferred genres include: counting viewing time of tuned program genres taken during high confidence periods of user presence; counting viewing time of recorded program genres in a personal video recorder (PVR) planner; analyzing genres associated with any user configured favorite channels.

In scenarios where no user activity occurred within a given time window, a confidence level of user presence could still be established if a dominant program genre is aired which correlates to a preferred user genre.

A dominant program genre is defined as being a measured duration of a specific genre within a time window, the measured duration being greater than the duration of all other program genres measured in the time window and greater than the average program duration within the same time window.

In such circumstances, as an alternative to applying a straight genre capping limit, the dominant genre measurement can be weighted by calculating a configured percentage of the time accrued for the genre during the time window.

An example scenario is as follows based on the capping limits of table 3 below.

The user behavioral profiling agent 56 has determined that the user 18 has a preference for sport.

In an hour time window, no user interaction was detected by the activity monitoring module 24 with the end-user rendering unit 12 or the audio-visual outputting arrangement 16.

In the hour time window, a 45 minute sports program and a 15 minutes news program were rendered to the audio-visual outputting arrangement 16.

The dominant program genre is sport, which correlates to the preferred user genre as reported by the user behavioral profiling agent 56. The duration of the sports program is greater than the average program duration in the time window. Therefore, an 80% dominant genre weighting is applied to the sport measurement instead of a 20 minute capping limit.

TABLE 3

Example Capping Limit Table with Dominant Genre Weighting Information.
Cap Ref: 1

| Content Category | Capping Limit (units of minutes) |
|---|---|
| Sports | 20 |
| Movie | 60 |
| Soap | 25 |
| Documentary | 20 |
| News | 5 |
| Other | 15 |
| Dominate Genre Weighting | 80% |

The time attributed to viewing is 36 minutes for the sports program (80% of 45 minutes) and 5 minutes for the news program (capping limit applied).

Therefore, the viewing estimation module 30 is typically operative to estimate viewing by the user 18 of a content item (or part of the content item), such that if: the user interaction was not determined during the time window; the content item (or part of the content item) has a genre which is predetermined as a preferred genre of the user; a measured duration of content having the genre in the time window is greater than the duration of content having any other genre in the time window; and the measured duration of the content having the genre in the time window is greater than an average content duration in the time window, then time attributed to the viewing of the content item (or part of the content item) is not reduced to the capping limit, but is set to be a certain fraction/percentage of the time measurement of how long the content item (or part of the content item) was rendered and outputted for display to the audio-visual outputting arrangement 16.

As stated previously above, the absence of user interaction during a time window can only provide a low confidence level of user presence. The media content viewing estimation system 10 cannot determine a definite absence of the user 18, since there is a chance that the user 18 is present and idling on the same channel for a sustained period of time. The media content viewing estimation system 10 therefore manages the problem through the application of defensive capping limits, correlated to time windows with low user presence confidence, based on the demographics of the host household.

A technique may be employed to allow a definite decision to be made regarding the absence of the user 18. At a configured time period of no determined user interaction within a time window, the rendering module 32 presents an on-screen-display (not shown) requesting user acknowledgement through the form a remote control key press or other suitable user interaction. The absence of user acknowledgement within a configured timeout period allows the media content viewing estimation system 10 to determine an absent user state. The length of the configured time period may be signaled to the end-user rendering unit 12 by the Headend 14.

To mitigate the risk of user annoyance through constant on-screen acknowledgement messages, the rendering module 32 may be configured to display the message in low confidence time windows, based on analysis of the household demographics of the end-user rendering unit 12.

Therefore, the rendering module 32 is typically operative to render an on-screen-display on the audio-visual outputting arrangement 16 to solicit an acknowledgement from the user 18 particularly during low confidence time windows. The user input module 34 is operative to monitor for the acknowledgement of the user 18.

The viewing estimation module 30 is operative to estimate the viewing by the user 18 of the content item(s) (or part(s) of content item(s)) such that:

(a) if the acknowledgement is provided by the user 18 within a time period then the time attributed to the viewing of the content item(s) (or part(s) of content item(s)) is equal to the time measurement of how long the content item(s) (or part(s) of content item(s)) was rendered and outputted for display on the audio-visual outputting arrangement 16; and (b) if the acknowledgement is not provided by the user 18 within the timeout period then the time attributed to the viewing of the content item(s) (or part(s) of content item(s)) is less than the time measurement of how long the content item(s) (or part(s) of content item(s)) was rendered and outputted for display on the audio-visual outputting arrangement 16, and typically the time attributed is reduced to zero.

It will be appreciated by those ordinarily skilled in the art that the method of the media content viewing estimation system 10 may be adapted to provide a confidence level of user presence and intent to view content for use-cases outside of a viewing measurement system, for example, but not limited to, an automated standby mechanism, or system processing priority (give background processing tasks more CPU time during periods of no user activity).

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A media content viewing estimation system comprising a physical computer processing machinery to:
   receive a time measurement of how long at least part of a content item was rendered by an end-user rendering unit and outputted for display to an audio-visual outputting arrangement by the end-user rendering unit during a time window, the time window being one from a set of time windows;
   determine user interaction with the end-user rendering unit and/or the audio-visual outputting arrangement; and
   estimate viewing by the user of the at least part content item such that if:
      user interaction was not determined during the time window then time attributed to the viewing of the at least part content item is reduced to a capping limit; however,
      if user interaction was not determined during the time window, time attributed to the viewing of the at least part content item is not reduced to the capping limit, but is set to be a certain fraction of the time measurement of how long the at least part content item was rendered and outputted for display to the audio-visual outputting arrangement if all of the following conditions apply:
         (a) the user interaction was not determined during the time window; and
         (b) the at least part content item has a genre which is predetermined as a preferred genre of the user; and
         (c) a measured duration of content having the genre in the time window is greater than the duration of content having any other genre in the time window; and
         (d) the measured duration of the content having the genre in the time window is greater than an average content duration in the time window.

2. The system according to claim 1, wherein the capping limit applied to the time attributed to the viewing of the at least part content item depends on a genre of the content item.

3. The system according to claim 1, wherein a size of the capping limit is dependent on a time of day that the time window is located in.

4. The system according to claim 1, wherein the length of the time window is dependent on a time of day and/or a day of the week.

5. The system according to claim 1, wherein the physical computer processing machinery is operative to estimate the viewing by the user of the at least part content item such that if user interaction was determined during the time window then the time attributed to the viewing of the at least part content item is equal to the time measurement of how long the at least part content item was rendered and outputted for display to the audio-visual outputting arrangement.

6. The system according to claim 1, wherein the physical computer processing machinery is operative to:
   render an on-screen-display on the audio-visual outputting arrangement to solicit an acknowledgement from the user;
   monitor for the acknowledgement of the user; and
   estimate the viewing by the user of the at least part content item such that:
      if the acknowledgement is provided by the user within a timeout period then the time attributed to the viewing of the at least part content item is equal to the time measurement of how long the at least part content item was rendered and outputted for display to the audio-visual outputting arrangement; and
      if the acknowledgement is not provided by the user within the timeout period then the time attributed to the viewing of the at least part content item is less than the time measurement of how long the at least part content item was rendered and outputted for display to the audio-visual outputting arrangement.

7. The system according to claim 6, wherein if the acknowledgement is not provided by the user within the timeout period then the time attributed to the viewing of the at least part content item is reduced to zero.

8. The system according to claim 1, wherein the physical computer processing machinery is operative to check an output status of the end-user content rendering device to the audio-visual outputting arrangement.

9. The system according to claim 1, wherein:
   the system is implemented in the end-user rendering unit; and
   the physical computer processing machinery is operative to monitor user interaction with the end-user rendering unit and/or the audio-visual outputting arrangement, during the time window.

10. A media content viewing estimation method comprising:
- receiving a time measurement of how long at least part of a content item was rendered by an end-user rendering unit and outputted for display to an audio-visual outputting arrangement by the end-user rendering unit during a time window, the time window being one from a set of time windows;
- determining user interaction with the end-user rendering unit and/or the audio-visual outputting arrangement; and
- estimating viewing by the user of the at least part content item such that if:
  - user interaction was not determined during the time window then time attributed to the viewing of the at least part content item is reduced to a capping limit; however,
  - if user interaction was not determined during the time window, time attributed to the viewing of the at least part content item is not reduced to the capping limit, but is set to be a certain fraction of the time measurement of how long the at least part content item was rendered and outputted for display to the audio-visual outputting arrangement if all of the following conditions apply:
- the user interaction was not determined during the time window; and
- the at least part content item has a genre which is predetermined as a preferred genre of the user; and
- a measured duration of content having the genre in the time window is greater than the duration of content having any other genre in the time window; and
- the measured duration of the content having the genre in the time window is greater than an average content duration in the time window.

* * * * *